3,479,307
PHENOL FORMALDEHYDE CONTAINING OIL
FREE POLYESTER INSULATING VARNISH
Deno Laganis, Schenectady, N.Y., assignor to Schenectady Chemicals, Inc., Schenectady, N.Y., a corporation of New York
No Drawing. Continuation-in-part of application Ser. No. 314,633, Oct. 8, 1963. This application Aug. 2, 1967, Ser. No. 657,775
Int. Cl. C08g *39/04;* H01b *3/42*
U.S. Cl. 260—20                                  15 Claims

ABSTRACT OF THE DISCLOSURE

An insulating varnish is made from an oil-free alkyd resin which is an ester of a plurality of polyhydric alcohols with isophthalic acid or terephthalic acid and up to 60% of an aliphatic dicarboxylic acid. One of the polyhydric alcohols contains two hydroxyl groups and another at least three hydroxyl groups. There is also included an oil soluble phenol-aldehyde resin. The aliphatic dicarboxylic acid is preferably a dimerized fatty acid. A portion of the phenolic resin can be replaced by an aminotriazine aldehyde resin.

---

The present application is a continuation-in-part of application Ser. No. 314,633, filed on Oct. 8, 1963 now Patent No. 3,338,743.

The present invention relates to an oil-free, heat-resistant electrical insulating varnish.

In commercial practice today electrical wires, e.g., the magnet wires of an electric motor, are coated with a wire enamel. The enamel coated wire assembly is then dipped into an insulating varnish and the varnish set on the coated wire.

Recently there have been developed wire enamels which are in the Class H category (suitable for continuous use at 180° C. or above). One such wire enamel is Isonel 200 which can be used at 190° C. and above.

Unfortunately, most insulating varnishes are not suitable for use at such high temperatures. Thus, conventional oil-modified alkyd resins and polyesters have heretofore been limited to insulating varnishes for armature and field coils of motors operating at Class B temperatures or, at best, at Class F temperatures (155° C.). Typical of the better oil-modified alkyd insulating varnishes which are suitable for Class F use are those in Thielking Patent 3,080,331.

Alkyd resins containing only a small amount of oil or fatty acids, e.g., 5 to 20% have poor thermal stability for a prolonged period of time.

Until the present time only silicone insulating varnishes have withstood the extreme high temperature conditions required for a Class H category. However, silicone varnishes are expensive and are not readily adaptable for all uses.

A common test for measuring the temperature resistance of wire enamels and varnishes is the dielectric twist aging test described in Thielking on Col. 5, lines 57–63. In general, the higher the temperature of testing the shorter the time before failure. In the dielectric twist aging test it has been found that the time before failure gives a straight line graph when plotted logarithmically against the temperature. Thus, in the twisted pairs test a commercial Class H wire enamel had a life of 1900 hours at 260° C., a life of 8000 hours at 240° C., a life of over 80,000 hours at 205° C. and an infinite life at lower temperatures. In contrast, a commercial Class F enamel had a life of 70 hours at 260° C., a life of 240 hours at 240° C., a life of 3000 hours at 205° C., a life of 80,000 hours at 160° C. and an infinite life at lower temperatures.

It is an object of the present invention to provide an insulating varnish improved high temperature properties.

Another object is to prepare an insulating varnish suitable for application over Class H wire enamels.

A further object is to prepare polyesters having improved flexibility.

Yet another object is to prepare polyesters having improved solubility in aromatic hydrocarbon solvents.

An additional object is to prepare polyester resins having a wider compatibility with phenolic resins.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It was now been found that these objects can be attained by employing as a varnish a non-oil modified isophthalic or terephthalic polyester with an oil soluble phenol-aldehyde resin. The use of a phenol-aldehyde resin, rather than an aminotriazine-aldehyde resin as in the parent case, has been found to give improved results because the aminotriazine-aldehyde resin containing compositions have excessive weight losses at elevated temperatures of 250° C. and above for periods of 720 hours or longer. Additionally, when the aminoplasts are the sole modifiers there is undesirable bubbling during the baking cycle in the oven. These disadvantages are overcome by employing oil soluble phenol-aldehyde resins.

It has further been found that the oil-free insulating varnishes with or without the phenol-aldehyde resins are improved by employing as the aliphatic acid (along with the aromatic acid or terephthalic acid) dimerized fatty acids. The dimerized fatty acids impart greatly improved flexibility to the polyester, as well as better solubility in aromatic hydrocarbon solvents and wider compatibility with phenol-aldehyde resins. The polyesters containing the dimerized fatty acids yield coatings with high thermal stability.

The oil soluble phenol-aldehyde resin as previously indicated gives the oil-free polyester varnish heat reactivity, helps the electrical properties, aids in the cure and lends hardness and abrasion resistance to films prepared from the varnish.

While there can be employed various aldehydes, such as acetaldehyde, propionaldehyde and furfural in preparing the oil soluble phenol-aldehyde resin, by far the preferred aldehyde is formaldehyde. The phenols employed are normally difunctional alkyl or aryl substituted phenols. Preferably, the substituent is in the para position. Thus, there can be used p-t-amylphenol, p-t-butylphenol, p-phenylphenol, p-octylphenol, p-dodecylphenol, 2,2-bis (p-hydroxyphenyl) propane (Bisphenol A), p-cresol, mixed m- and p-cresol, mixtures of alkylated and aryl phenols such as p-t-butylphenol with 2,2-bis (p-hydroxyphenyl) propane and mixtures of alkyl phenols such as p-cresol with p-t-butylphenol. As indicated, preferably all such phenols are condensed with formaldehyde.

As is well known in the art, these oil soluble phenol-aldehyde resin condensates are normally alkaline condensed and one of the resol type. Thus, there can be used resins made from 0.7 to 2 moles of formaldehyde per mole of phenol. In the working examples there were employed resins from 1 mole of phenol with 1.5 moles of formaldehyde employing sodium hydroxide as catalyst. In the examples employing the mixture of an alkyl phenol and Bisphenol A there was employed 0.75 mole of the alkyl phenol, e.g., p-t-amylphenol, 0.25 mole of Biphenol A and 1.5 moles of formaldehyde.

The oil-soluble phenol-formaldehyde resins employed are heat reactive. If the polyester does not contain dimerized fatty acids, the polyesters are most compatible with aryl phenol-formaldehyde condensates. However, if sufficient dimerized fatty acid is present in the polyester the polyester is compatible with either aryl or alkyl phenol-formaldehyde resins. The oil-soluble phenol-formaldehyde resins are usually employed in an amount of 5 to 80% of the total of the polyester and phenolic resin on a dry solids basis. The preferred range is 30 to 60% of phenolic resin to achieve a proper balance of improved properties for the ultimate in thermal characteristics.

A portion of the phenol-aldehyde resin can be replaced by other adjuvants such as epoxy resins e.g., Bisphenol A-epichlorhydrin resin or glycerol-epichlorhydrin or epoxy-acrylics. There can also be employed aminoplasts such as alkylated urea or triazine-aldehyde resins. As the aldehyde there is preferably employed formaldehyde, but there can be used furfural, acetaldehyde, propionaldehyde and other aldehydes. The preferred triazine is benzoguanamine but there can also be employed other guanamines such as formoguanamine, acetoguanamine, lauroguanamine, stearguanamine and propioguanamine as well as melamine, and N,N-dimethyl melamine.

As the alkylating agent there can be used methyl, alcohol, ethyl alcohol, propyl alcohol, isopropyl alcohol, butyl alcohol, secondary butyl alcohol, amyl alcohol, hexyl alcohol, cyclohexyl alcohol, octyl alcohol, isooctyl alcohol and 2-ethylhexanol. The preferred alcohol is butyl alcohol. The aminoplast resin employed in the examples was butylated benzoguanamine-formaldehyde. The aminoplast resin, when employed, is used in an amount of 2 to 20% of the total weight of the polyester, phenolic resin and aminoplast. The aminoplast in any event should be employed in an amount less than the phenolic resin and as indicated supra, preferably is omitted. As the polyester there is employed the reaction product of a mixture of a polyhydric alcohol having at least three hydroxyl groups such as glycerine, trimethylolethane (TME), trimethylolpropane (TMP), pentaerythritol, tris (2-hydroxyethyl)isocyanurate, dipentaerythritol, tripentaerylthritol, 2,4,6-hexanetriol, alpha methyl glucoside, and sorbitol and a diol such as ethylene glycol, propylene glycol, butylene glycol, 2,2,4-trimethyl pentanediol, neopentyl glycol, diethylene glycol, dipropylene glycol, butanediol-1,4, pentanediol-1,5, di(hydroxymethyl) ether of diphenylolpropane (Bisphenol-A-ethylene oxide adduct) or butenediol-1,4 with isophthalic acid or terephthalic acid or the acyl halides thereof, e.g., isophthalic acid dichloride, or a lower dialkyl ester thereof, e.g., methyl, ethyl, propyl, butyl, amyl, hexyl and octyl isophthalates and the corresponding terephthalates, as well as the half esters, e.g., monomethyl isophthalate. Orthophthalic acid is unsuitable since its polyesters depolymerize and deesterify at high temperature. Preferably, the diol has 2–5 carbon atoms. The most preferred diol is neopentyl glycol and the preferred alcohols having at least three hydroxyl groups are glycerine, TME and TMP.

While there can be employed 100% of the polyhydric alcohol ester of terephthalic acid or isophthalic acid, preferably, the acid component is partially replaced by aliphatic dibasic acids to provide improved flexibility to the polymer chain or backbone during heat aging. The addition of the aliphatic dibasic acid overcomes the deficiency of cracking or development of minute fissures in the film coated on the wire during the elevated temperature aging period. As the aliphatic dibasic acid there is preferably employed adipic acid, but there can also be alkanedioic acids such as succinic acid, glutaric acid, pimelic acid, malonic acid, azelaic acid and sebacic acid.

As previously pointed out, preferably there is employed as the portion of the acids dimerized fatty acids. Such dimerized fatty acids are prepared by dimerizing unsaturated long chain fatty acids, e.g., dimerized linoleic acid, dimerized licanic acid, dimerized dehydrogenated castor oil acids, dimerized eleostearic acid, dimerized isomerized linoleic acid, dimerized linolenic acid, dimerized isomerized linolenic acid. The dimerized acids can be prepared, for example, in known fashion either by dimerizing the pure unsaturated acids or by dimerizing the fatty acid of tall oil, chinawood oil, oiticica oil, dehydrogenated castor oil, soybean oil, cottonseed oil, sunflower oil, safflower oil, corn oil, linseed oil, perilla oil, whale oil, sardine oil or by dimerizing the fatty acids of isomerized oils such as isomerized soybean oil, isomerized cottonseed oil, isomerized sunflower oil, isomerized safflower oil, isomerized corn oil, isomerized linseed oil, isomerized perilla oil, isomerized sardine oil and isomerized whale oil.

When commercial dimerized acids are employed they preferably have only a small amount of monobasic acid although they can contain substantial amounts of trimerized fatty acids.

Examples of suitable commercial dimerized fatty acids are given in the following table. All of these dimerized acids were prepared from tall oil fatty acids.

TABLE 1

|  | Empol 1014 | Empol 1016 | Empol 1018 | Empol 1022 | Empol 1024 |
|---|---|---|---|---|---|
| Dimerized Fatty Acids | 95 | 87 | 83 | 75 | 75 |
| Trimerized Fatty Acids | 4 | 13 | 17 | 22 | 25 |
| Monomeric Fatty Acids | 1 | 0 | 0 | 3 | 01 |
| Acid Value | 191–5 | 190–8 | 188–196 | 186–194 | 186–194 |
| Saponification Value | 195–9 | 194–200 | 192–8 | 191–9 | 191–9 |

The dimerized fatty acid employed in the examples was Empol 1018 which contains only a trace of monobasic acid.

The preferred dimerized fatty acids have 36 carbon atoms and the trimerized fatty acids admixed therewith have 54 carbon atoms.

The presence of the dimerized fatty acids in the polyester markedly improves solubility in aromatic hydrocarbon solvents, e.g. xylene. Even the incorporation of a small percentage of these acids in the formation of the polyester provides a resin that is completely soluble in aromatic hydrocarbons. When no dimerized acids are present the polyester is not soluble in straight aromatic hydrocarbons, but requires some polar solvents as well.

In preparing the polyesters a portion of the terephthalic acid or isophthalic acid can be replaced by trimellitic acid or pyromellitic acid. Mixtures of terephthalic acid and isophthalic acid can also be used.

On a molar basis there is normally used 1 mol of diol to from 0.7 to 5 mols of polyhydric alcohol having at least three hydroxyl groups. On an equivalent basis there is used 1 mol of diol to from 1 to 7.5 equivalents of polyhydric alcohol having at least three hydroxyl groups. Preferably, there is 1.6 to 5.5 equivalents of the polyhydric alcohol having at least three hydroxyl groups per equivalent of diol.

The total number of hydroxyl groups on the alcohol reactants is usually from 1.1 to 1.6 times the total number of carboxyl groups of the acids. Preferably, the hydroxyl groups are 1.2 to 1.45 times the carboxyl groups.

When an aliphatic acid is employed generally there is used from 10 to 50 mol percent of aliphatic dibasic acid and 90 to 50 mol percent of isophthalic or terephthalic acid. Preferably, 20 to 40 mol percent of the acid component is the aliphatic dibasic acid and most preferably at least 25 mol percent is the aliphatic acid equivalents when the dimerized acids are employed. They range from 12.5 to 100% of the total equivalents of aliphatic acid, preferably 25 to 50%. (The trimerized fatty acids if present in the dimerized fatty acids are included in the dimerized fatty acid percentages.)

The resins of the insulating varnishes of the present invention are heat reactive. The insulating varnishes can be used to coat copper or silver wire or motor rotors made of copper magnet wire directly but are usually employed over an enameled magnet wire.

The preferred enamel is the polymeric ester of a polycarboxylic acid of the group consisting of terephthalic and isophthalic acid with up to 80 equivalent percent of another polycarboxylic acid, e.g., adipic acid, hemimellitic acid, succinic acid, sebacic acid, hexachloroendomethylene tetrahydrophthalic acid or the like, and an alcohol of the group consisting of tris(2-hydroxyethyl)isocyanurate with up to 90 equivalent percent of another polyhydric alcohol, e.g., any of the diols or polyhydric alcohols having at least three hydroxyl groups set forth previously. The total number of hydroxyl groups on the alcohol reactant is from 1 to 1.6 times the total number of carboxylic groups of the acid.

The preferred enamel is a Class H enamel. Examples of the preferred enamels are those made from the following compositions, the parts all being by weight.

Composition A:

|  | Parts |
| --- | --- |
| Ethylene glycol | 147 |
| Glycerine | 97 |
| 1,4-butanediol | 74 |
| Tris(2-hydroxyethyl)isocyanurate | 608 |
| Dimethyl terephthalate | 1164 |

Composition B:

| 2,2,4-tetramethyl 1,3-cyclobutanediol | 119.6 |
| --- | --- |
| Tris(2-hydroxyethyl)isocyanurate | 511 |
| Ethylene glycol | 129 |
| Glycerine | 128 |
| Dimethyl terephthalate | 1112.8 |

Composition C:

| Tris(2-hydroxyethyl)isocyanurate | 1044 |
| --- | --- |
| Dimethyl terephthalate | 776 |

Composition D:

| Tris(2-hydroxyethyl)isocyanurate | 992 |
| --- | --- |
| Ethylene glycol | 88 |
| Dimethyl terephthalate | 920 |

Composition E:

| Tris(2-hydroxyethyl)isocyanurate | 556 |
| --- | --- |
| Dimethyl terephthalate | 413 |
| Adipic acid | 31 |

Composition F:

| Tris(2-hydroxyethyl)isocyanurate | 4400 |
| --- | --- |
| Ethylene glycol | 481 |
| Dimethyl terephthalate | 5019 |

Composition F is a wire enamel available commercially as Isonel 200.

The wire enamels from Compositions A, B, C, D, E and F are not a part of the present invention but can be made in the manner set forth in Meyer et al. Patent 3,211,585.

The insulating varnishes of the present invention include conventional solvents such as aromatic hydrocarbons, e.g. xylene, benzene, toluene, aromatic naphtha, aliphatic hydrocarbons, e.g., hexane, cyclohexane, petroleum ether, aliphatic naphtha, octane, mineral spirits. When a polar solvent is also employed it usually is an oxygenated solvent such as butyl alcohol, amyl alcohol, ethylene glycol monoethyl ether (Cellosolve), ethyl glycol monoethyl ether acetate (Methyl Cellosolve Acetate), diethylene glycol monoacetate, ethylene glycol, capryl alcohol, ethyl alcohol, dioxane, isophorone, acetone, butyl Carbitol diisobutyl ketone, butyl acetate methyl ethyl ketone. Also, there can be used N-methyl pyrrolidone, tetrachloroethylene, or dimethyl formamide as a solvent. Usually, 25 to 75% by weight of the solvent is aromatic hydrocarbon and the balance (75 to 25%) is an alcohol except that when dimerized fatty acids are employed the solvent can be 100% hydrocarbon.

Unless otherwise indicated in the following examples all parts and percentages are by weight.

EXAMPLE 1

|  | Weight, Grams | Gram Equivalents | Ratio of Equivalents |
| --- | --- | --- | --- |
| (A) Neopentyl Glycol | 655 | 12.6 | 0.90 |
| (B) Trimethylol Propane | 281 | 6.3 | 0.45 |
| (C) Terephthalic Acid | 349 | 4.2 | 0.30 |
| (D) Adipic Acid | 205 | 2.8 | 0.20 |
| (E) Terephthalic Acid | 348 | 4.2 | 0.30 |
| (F) Adipic Acid | 204 | 2.8 | 0.20 |

Ingredients A, B, C and D were charged to a three liter glass three-neck flask equipped with an agitator, thermometer, gas inlet tube, 3-bubble cap Snyder column, distilling head, and condenser. Heat was applied and the temperature was gradually raised to 440–460° F. The batch was held there until it became clear. The contents were allowed to cool to 350° F., and ingredient E was added to the flask. Heat was re-applied and the temperature raised to a range of 450–480° F. Again, the batch was cooled to 350 F. and ingredient F was added to the flask. The reheating schedule was the same as previously described for ingredient E, and the polyester was controlled to a final viscosity of F on the Gardner-Holdt scale at 50% solids in a solvent blend of 95 parts by weight of xylol and 5 parts by weight of ethylene glycol monobutyl ether. The acid number of the solution was between 2 and 5. At this point, the molten resin was discharged into a metal container as a 100% solids material.

EXAMPLE 2

The polyester of Example 1 was dissolved in a solvent blend of 95 parts by weight of xylol and 5 parts by weight of ethylene glycol monobutyl ether to a solids content of 60% and a viscosity of U on the Gardner-Holdt scale. To 600 grams of this polyester solution 181.8 grams of a m,p-cresol formaldehyde alkaline condensed resinous product (solution at 66% solids dissolved in a 1:1 ratio of xylol: ethylene glycol monoethyl ether by weight), 51 grams of butylated benzoguanamine-formaldehyde resin, and 262.2 grams of a solvent mixture of 75% by weight of xylol and 25% by weight of ethylene glycol monobutyl ether were admixed to prepare a high temperature insulating varnish which had the following electrical properties when applied to copper wire over a coating of Isonel 200, the solvent evaporated and the resin cured for 1 hour at 200° C.

Dielectric strength, volts/mil, initial: 1554
Dielectric strength, percent retention (heat stability): 70.9

EXAMPLE 3

Example 3 used the same ingredients as Example 2 except for different proportions of phenolic resin to polyester in preparing the varnish as follows:

To 450 grams of the polyester at 60% solids were added 175.5 grams of m,p-cresol formaldehyde resin solution (at 66% solids in a 1:1 ratio of xylol: ethylene glycol monoethyl ether by weight), 41 grams of butylated benzoguanamine-formaldehyde resin, and 201.6 grams of a solvent mixture of 75% by weight of xylol and 25% by weight of ethylene glycol monobutyl ether. The resulting varnish had the following characteristics when applied to copper over a coating of Isonel 200, the solvent evaporated and the resin cured for 1 hour at 200° C.

Dielectric strength, volts/mil, initial: 1462
Dielectric strength, percent retention (heat stability): 44.2

EXAMPLE 4

| | Weight, Grams | Gram Equivalents | Ratio of Equivalents |
|---|---|---|---|
| (A) Neopentyl Glycol | 468 | 9 | 0.90 |
| (B) Trimethylol Propane | 201 | 4.5 | 0.45 |
| (C) Terephthalic Acid | 332 | 4 | 0.4 |
| (D) Adipic Acid | 146 | 2 | 0.2 |
| (E) Isophthalic Acid | 166 | 2 | 0.2 |
| (F) Dimer Acid (Emery's) Empol 1018 | 590 | 2 | 0.2 |

Ingredients A, B, C and D were charged to a three liter flask equipped in the same manner as in Example 1. The reaction conditions were similar to those in Example 1. Material E was added at 350° F. and the heating schedule was the same as in Example 1. Then, reactant F was charged to the flask and the resin heated to give a final viscosity of Z ½ (Gardner-Holdt scale) and a specific gravity of 1.005 (at 25° C. at 69.7% solids in xylene. The resin had an acid number of 5.1.

EXAMPLE 5

A varnish was prepared by admixing at ambient temperature 460 grams of the polyester solution of Example 4 with 284 grams of an amyl-phenol Bisphenol A formaldehyde condensate (at 48.3% solids in xylol), 23 grams of xylol and 115 grams of mineral spirits. The polyester to phenolic resin ratio on a dry solids basis was 70:30, respectively. The electrical properties were:

Dielectric strength, volts/mil, Initial: 1620
Dielectric strength, percent retention (heat stability): 97.1

EXAMPLE 6

A varnish with the same ingredients as Example 5 was prepared whereby only the ratio of polyester to phenolic was changed from 70:30 to 60:40, respectively. The electrical properties were:

Dielectric strength, volts/mil, Initial: 1677
Dielectric strength, percent retention (heat stability): 92.3

EXAMPLE 7

There was prepared another insulating varnish with the same ingredients as Example 5, but the polyester to phenolic resin ratio was changed to a 50:50 combination. The electrical properties were:

Dielectric strength, volts/mil, Initial: 1729
Dielectric strength, percent retention (heat stability): 83.9

EXAMPLE 8

| | Weight, Grams | Gram Equivalents | Ratio of Equivalents |
|---|---|---|---|
| (A) Neopentyl Glycol | 562 | 10.8 | 0.90 |
| (B) Trimethylol Propane | 241 | 5.4 | 0.45 |
| (C) Isophthalic Acid | 299 | 3.6 | 0.30 |
| (D) Adipic Acid | 307 | 4.2 | 0.35 |
| (E) Isophthalic Acid | 299 | 3.6 | 0.30 |
| (F) Dimerized Acid (Empol 1018) | 177 | 0.6 | 0.05 |

The polyester was prepared in the manner described in Example 1. There was prepared a solution of the thus formed polyester in xylene having the following properties:

Viscosity: X (Gardner-Holdt scale)
Specific gravity: 1.040 (at 25° C.)
Percent solids: 68.1
Acid number: 3.1

EXAMPLE 9

An insulating varnish was prepared by admixing at ambient temperature 720 grams of the polyester solution of Example 8 with 695 grams of an amyl-phenol Bisphenol A formaldehyde condensate (at 48.3% solids in xylol), 99 grams of xylol and 99 grams of mineral spirits. The polyester to phenolic resin ratio on a dry solids basis was 55:45.

EXAMPLE 10

| | Weight, Grams | Gram Equivalents | Ratio o Equivalents |
|---|---|---|---|
| (A) Neopentyl Glycol | 374.4 | 7.2 | 0.90 |
| (B) Trimethylol Propane | 161 | 3.6 | 0.45 |
| (C) Terephthalic Acid | 199.2 | 2.4 | 0.30 |
| (D) Dimerized Acid Empol 1018 | 464 | 1.6 | 0.20 |
| (E) Terephthalic Acid | 199.2 | 2.4 | 0.30 |
| (F) Dimerized Acid Empol 1018 | 464 | 1.6 | 0.20 |

The polyester was prepared in the manner described in Example 1. The resultant polyester was dissolved in xylene to give a solution having the following properties:

Viscosity: Y ½ (Gardner-Holdt scale)
Specific gravity: 0.964
Percent solids: 60.5
Acid number: 2.2

EXAMPLE 11

There was prepared an insulating varnish as in Example 7 except the polyester solution shown in Example 10 was incorporated rather than that of Example 4 to give a varnish containing a ratio of polyester to phenolic resin on a solids basis of 50:50.

EXAMPLE 12

| | Weight, Grams | Gram Equivalents | Ratio of Equivalents |
|---|---|---|---|
| (A) Neopentyl Glycol | 468 | 9 | 0.90 |
| (B) Trimethylolethane | 180 | 4.5 | 0.45 |
| (C) Isophthalic Acid | 311 | 3.75 | 0.375 |
| (D) Isophthalic Acid | 311 | 3.75 | 0.375 |
| (E) Dimer Acid (Emery's) Empol 1018 | 738 | 2.5 | 0.25 |

In the same manner as that in Example 1 the ingredients set forth above were reacted so that the solution of the resultant polyester in xylene had the following properties:

Visconsity: Z1 (Gardner-Holdt scale)
Specific gravity: 1.004 (at 25° C.)
Percent solids: 70
Acid number: 3.36

EXAMPLE 13

The polyester solution of Example 12 was compounded with an amyl-phenol bisphenol A formaldehyde condensate (at 48.3% solids in xylol) so that the polyester to phenolic ratio was 65:35 on a solids basis.

EXAMPLE 14

A similar insulating varnish to that in Example 13 was prepared except the phenolic to polyester ratio was changed to 60:40 on a solids basis.

Other suitable polyesters for use in the present invention were prepared from the reactants set forth in Table 2 with the amounts of reactants set forth as equivalents.

TABLE 2

| Reactant | Example 15 | Example 16 | Example 17 | Example 18 | Example 19 | Example 20 |
|---|---|---|---|---|---|---|
| Terephthalic Acid | 0.85 | 0.85 | 0.72 | 0.6 | 0.4 | 0.4 |
| Isophthalic Acid | | | | | 0.2 | 0.2 |
| Adipic Acid | 0.15 | 0.15 | 0.28 | | 0.3 | 0.1 |
| Empol 1018 | | | | 0.4 | 0.1 | 0.3 |
| Neopentyl Glycol | 1.30 | 1.10 | 0.9 | 0.9 | 0.9 | 0.9 |
| Trimethylol Propane | 0.105 | 0.27 | 0.45 | 0.45 | 0.45 | 0.45 |

What is claimed is:

1. An insulating varnish consisting essentially of (1) a curable oil-free alkyd resin selected from the group consisting of the esters of a plurality of reactants consisting essentially of a plurality of polyhydric alcohols with a member of the group consisting of terephthalic acid, isophthalic acid and mixtures of such acids with 10 to 50 equivalent percent of an aliphatic dicarboxylic acid, at least 12.5% of the aliphatic dicarboxylic acid being dimerized long chain fatty acids, at least one of said polyhydric alcohols containing only two hydroxyl groups and being selected from the group consisting of ethylene glycol, propylene glycol, butylene glycol, 2,2,4-trimethyl pentanediol, neopentyl glycol, diethylene glycol, dipropylene glycol, butanediol-1,4, pentanediol-1,5, di(hydroxymethyl) ether of diphenylolpropane and butene diol-1,4 and at least one of the polyhydric alcohols containing at least three hydroxyl groups, there being 1.1 to 1.6 alcoholic groups for each carboxyl group in the alkyd resin, and (2) 5 to 80% of an oil soluble phenol-aldehyde resin based on the total weight of the alkyd resin and phenol-aldehyde resin, the phenol-aldehyde resin being made from 1 mole of the phenol and 0.7 to 2 mols of the aldehyde.

2. An insulating varnish according to claim 1 wherein the phenol-aldehyde resin is a phenol-formaldehyde resin.

3. An insulating varnish according to claim 2 including an aromatic hydrocarbon solvent wherein the phenol-formaldehyde resin has an alkyl or aryl group para to the phenolic hydroxyl group.

4. An insulating varnish according to claim 3 wherein the phenol-formaldehyde resin is 30 to 60% of the total of alkyd resin and phenol-formaldehyde resin by weight.

5. An insulating varnish according to claim 4 wherein 25 to 50% of the total aliphatic dicarboxylic acid is dimerized long chain fatty acids and 25 to 40 mol percent of the total acid component is dibasic aliphatic acid.

6. An insulating varnish according to claim 2 wherein the alkyd resin comprises dimerized long chain fatty acids.

7. An insulating varnish according to claim 6 wherein the dimerized long chain fatty acids is 12.5 to 100% of the total aliphatic dicarboxylic acid on an equivalent basis.

8. An insulating varnish according to claim 1 wherein the dimerized long chain fatty acids are 25 to 50% of the total aliphatic dicarboxylic acid, the balance being alkanedioic acid and the phenol-formaldehyde resin has an alkyl or aryl group para to the phenolic hydroxyl group.

9. An insulating varnish according to claim 8 wherein the alkanedioic acid is adipic acid.

10. A varnish including a curable alkyd resin which is an ester of a plurality of reactants consisting essentially of a plurality of polyhydric alcohols with a member of the group consisting of terephthalic acid, isophthalic acid and mixtures of such acids with 10 to 50 equivalent percent of an aliphatic dicarboxylic acid, 12.5 to 100 mol percent of the aliphatic acid being dimerized long chain fatty acid, at least one of said polyhydric alcohols containing only two hydroxyl groups and being selected from the group consisting of ethylene glycol, propylene glycol, butylene glycol, 2,2,4-trimethyl pentanediol, neopentyl glycol, diethylene glycol, dipropylene glycol, butanediol-1,4, pentanediol-1,5, di(hydroxymethyl) ether of diphenylolpropane and butene diol-1,4 and at least one of the polyhydric alcohols containing at least three hydroxyl groups, there being 1.1 to 1.6 alcoholic groups for each carboxyl group in the alkyd resin, an aromatic hydrocarbon solvent as the sole solvent and an oil soluble phenol-formaldehyde resin made from 1 mole of the phenol and 0.7 to 2 mols of formaldehyde.

11. A composition according to claim 10 wherein the dimerized acid consists essentially of dimerized linoleic acid.

12. An electrical conductor coated with the cured mixture of alkyd resin and phenol aldehyde resin of claim 1.

13. An electrical conductor according to claim 12 wherein the phenol-aldehyde resin is phenol-formaldehyde resin and 10 to 50 mol percent of the total acids is aliphatic dicarboxylic acid and the phenol-formaldehyde has an alkyl or aryl group para to the phenolic hydroxyl group.

14. An insulating varnish according to claim 1 wherein the dihydric alcohol is neopentyl glycol, the polyhydric alcohol containing at least three hydroxyl groups is selected from the group consisting of trimethylolethane and trimethylolpropane, the phenol-aldehyde resin is a phenol-formaldehyde resole made from 1 mole of a para alkyl or aryl phenol and 0.7 to 2 moles of formaldehyde, the phenol-formaldehyde resin is 30 to 60% of the total of alkyd resin and phenol-formaldehyde resin by weight, 25 to 50% of the total aliphatic dicarboxylic acid is dimerized long chain fatty acids, 25 to 40 mol percent of the total acid component is dibasic aliphatic acid and the solvent of the varnish is an aromatic hydrocarbon.

15. An insulating varnish according to claim 14 wherein the dibasic aliphatic acid is azelaic acid.

References Cited

UNITED STATES PATENTS

| | | | |
|---|---|---|---|
| 3,080,331 | 3/1963 | Thielking | 260—20 |
| 3,108,089 | 10/1963 | Ferstandig | 260—33.6 |
| 3,039,979 | 6/1962 | Carlick et al. | 260—850 |
| 3,198,759 | 8/1965 | Schmidle | 260—20 |

OTHER REFERENCES

Simonds et al. "Handbook of Plastics," 1949 (pp. 381 to 383 and 666 to 671 relied on).

DONALD E. CZAJA, Primary Examiner

WILLIAM E. PARKER, Assistant Examiner

U.S. Cl. X.R.

117—132, 218; 260—22